R. T. WILSON.
ARTIFICIAL FISH BAIT.
APPLICATION FILED JAN. 13, 1916.

1,220,921.

Patented Mar. 27, 1917.

WITNESSES:
Jas. K. McCathran
J. J. Mawhinney

Richard T. Wilson, INVENTOR
BY
Attorney

UNITED STATES PATENT OFFICE.

RICHARD T. WILSON, OF HASTINGS, MICHIGAN, ASSIGNOR OF ONE-HALF TO ABEN E. JOHNSON, OF HASTINGS, MICHIGAN.

ARTIFICIAL FISH-BAIT.

1,220,921.     Specification of Letters Patent.     Patented Mar. 27, 1917.

Application filed January 13, 1916. Serial No. 71,922.

*To all whom it may concern:*

Be it known that I, RICHARD T. WILSON, a citizen of the United States, residing at Hastings, in the county of Barry and State of Michigan, have invented a new and useful Artificial Fish-Bait, of which the following is a specification.

The present invention relates to an improved artificial bait for attracting fish, and has for an object to provide a simple structure of bait provided with means for adjusting the same to any desired depth in the water, without lengthening or shortening the line, or in any ways disturbing the securement of the line to the bait; and to provide means for adjusting the bait to different depths and to simulate the natural movements of minnows, and other small fish, which are usually employed as bait. The improved bait may also be adjusted to travel over the surface of water, if desired.

Another object of this invention is to provide a buoyant body having a configuration substantially conforming to the configuration of a minnow, which is adapted for attachment in the usual manner to a fishing line, and to be drawn through the water, to represent a minnow or small fish traveling. The invention contemplates in carrying out this object, the provision of a plane or adjustable plate, which is pivoted upon the forward end of the buoyant body and provided with means for securing the plane at different angles with respect to the longitudinal axis of the body, so as to present more or less of the flat face of the plane against the water, and at the desired angle therein to deflect the buoyant body downwardly beneath the surface as it is drawn forward, or to so adjust the plane as to support the buoyant body, and cause it to rise and move over the surface of the water.

Other objects and advantages of this invention will be brought out in the following description of the present preferred embodiment of the invention, which is shown in the accompanying drawing, wherein—

Figure 1:
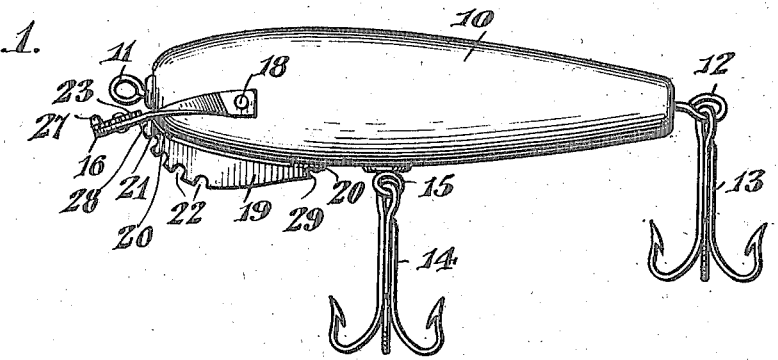
Figure 1 is a side elevation of an artificial fish bait embodying the features of this invention, and being adjusted to travel at a considerable depth beneath the surface of the water.

Referring to the drawing, wherein like parts are designated by similar characters of reference throughout the several views, 10 designates the body of the improved artificial fish bait, which is made of wood, cork, or any other suitable material, buoyant in water, and which is given an outer contour simulating that of a minnow, or other small fish usually employed as bait. Screw eyes 11 and 12 are respectively positioned in the head and tail ends of the body 10, the screw eye 11 being adapted for attachment to the line for drawing the body 10 through the water, or over the surface thereof. The screw eye 12 is provided with a multiple hook 13, and a second multiple hook 14 is preferably mounted upon the screw eye 15 carried in the bottom of the body 10, intermediate the ends thereof.

Figure 3:
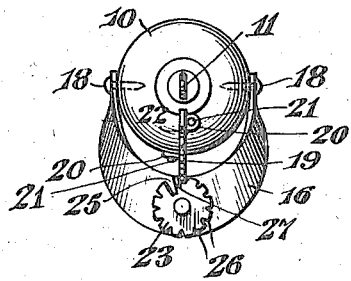
Fig. 3 is a head end elevation, showing the deflecting plane extending vertically downward midway of the positions shown in Figs. 1 and 2, and showing the locking disk securing the plane from swinging movement.
Figure 4:
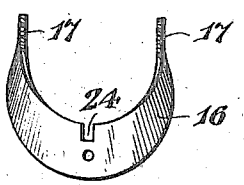
Fig. 4 is a detail top plan view of the deflecting plane, the ends thereof being shown in section.
Figure 5:
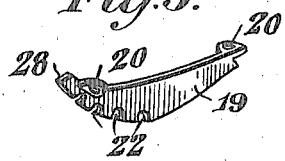
Fig. 5 is a detail perspective view of the sector plate carried by the body and serving to hold the plane in various adjusted positions.
Figure 6:
Fig. 6 is a detail perspective view of the locking disk, which coöperates with the sector plate to secure the deflecting plane in adjusted position.

The feature of the present invention is in providing means for deflecting the body 10 down into the body of water at the desired depth, as the screw eye 11 is drawn forwardly to drag the body 10. This feature of the invention is carried out by the provision of a deflecting plane 16 substantially of the form of a crescent, and having its opposed spaced apart ends gradually turned or twisted into spaced apart transverse planes lying in parallelism, as shown in Fig. 4. These ends of the plane 16 are apertured as at 17 to provide openings through which rotatably pass pivots 18. The pivots 18, as shown to advantage in Fig. 3, are driven into the body 10 at the opposite sides thereof and serve as pivotal supports for the ends of the crescent shaped plane 16. The inner edge of the plane 16 is eccentric to the bottom of the body 10, and carried by the body, and arranged between the body and the plane is a sector plate 19. This plate engages edgewise against the lower side of the body 10 and is held substantially in the vertical plane of the central axis of the body by means of attaching lugs 20, which lie flat against the body and project from the opposite sides of the sector plate 19 for the reception of screws 21, or the like, which enter the body and secure the plate fin-like against the bottom of the body. The forward lower edge of the sector plate 19 is provided with a plurality of notches 22, which are spaced apart. Upon the intermediate portion of the deflecting plane 16 is rotatably mounted a locking disk 23. As may be seen in Fig. 4, the inner edge of the plane 16 is provided with a recess or slot 24 adapted to receive therein the lower notched edge of the sector plate 19. From Fig. 6, it will be noted that the locking disk 23 is provided with a similarly shaped recess or slot 25 adapted to register with the notch 24 when the disk 25 is rotated, by engagement of the thumb and finger nails, or a suitable instrument, with the serrations, or notches, 26 formed in the periphery and outer face of the locking disk 23. The disk 23 has an outturned stop lug 27 adapted to abut the side of the sector plate 19, when the disk is turned around through practically a complete revolution, after the plane 16 has been adjusted, Fig. 3 showing the stop lug 27 bearing against the sector plate to prevent the disk 23 from turning farther to register the recess 25 with the recess 24, and thus remove the disk from the adjacent notch 22.

In Fig. 1 of the drawings, the plane 16 is disclosed as adjusted for deflecting the body 10 a relatively great distance beneath the surface of the water, and in this adjustment the disk 23 engages against a shoulder 28 formed upon the upper forward end of the sector plate 19, so as to hold the deflecting plane 16 in its slightly downwardly inclined position. It will be noted that the locking disk 23 is turned through but one half a revolution, so as to dispose the slot 25 in the disk at the farthermost point from the shoulder 28. When it is desired to draw the body 10 along the surface of the water, the disk 23 is turned to register the slot 25 therein with the slot 24 of the sector plate, at which time the plate 16 is released from the sector plate and may be swung backwardly into the position shown in Fig. 2. In this position, the locking disk 23 is again rotated to move the slot 25 out of registry with the slot 24 and thus engage the peripheral edge of the disk 23 against the rear shoulder 29 of the sector plate, which shoulder comprises the extreme rear edge of the sector plate. Thus, the disk 23 holds the plane 16 at a backwardly and downwardly inclined position, so as to serve as a deflecting plane to cause the body 10 to ride upon the surface of the water. In this instance, the disk 23 is rotated through substantially a complete revolution, so as to bring the stop lug 27 against the side of the sector plate 19, and thus hold the slot 25 out of registry with the slot 24. The stop lug 27 is used as it serves the purpose of a positive lock for the disk 23 which would seldom ever vibrate or work around sufficiently, to carry the disk through an entire revolution to release the plane 16.

It is thus seen that by swinging the plane 16 into various angles and then operating the locking disk 23, the plane may be secured in the adjusted angle, and the angular adjustment of the plane 16 determines the depth at which the body 10 travels, and also regulates the lateral vibration of the body as it is drawn forward.

Figure 2:
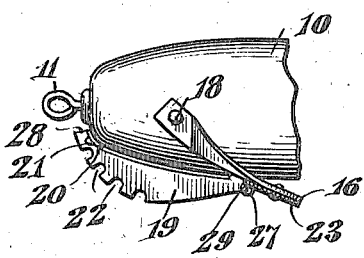
Fig. 2 is a fragmentary head-end view of the bait in side elevation, showing the guiding or deflecting plane adjusted in a position opposite in the extreme to that shown in Fig. 1, for supporting the buoyant body upon the surface of the water.

In the use of the improved bait, as the body 10 is drawn through the water, the plate 16, when adjusted as shown in Fig. 1, is inclined forwardly and downwardly, so as to present a downwardly inclined flat deflecting surface to the water as the body 10 is drawn therethrough. This inclined surface, therefore, tends to move edgewise in its own plane, or downwardly and to thus tend to follow the path of least resistance through the water. This tendency creates a downward pull or deflection of the body 10, as it is drawn through the water, and consequently the body 10 will be held down at a considerable depth by the plane 16, as the body is drawn through the water. When the plane 16 is adjusted by being swung downwardly toward and into the position shown in Fig. 3, the resistance of the plane 16 will be increased, and the angle of the plane with respect to the longitudinal axis of the body 10 will be increased. The effect of this is that the plane will tend to move downwardly in substantially a vertical plane, or at least tend to approach the downward vertical movement thereof, as the body 10 is drawn through the water. The deflection of the body 10 will, therefore, not be as great as when the plane 16 more nearly approaches a true horizontal position, for the resistance offered by the plane will in a certain measure tend to lift the body 10 up in the water, and will thus overcome, to a more or less extent, the tendency to carry the body 10 down. Thus, as the plane 16 is swung downwardly from the position shown in Fig. 1, to the position shown in Fig. 3, the body 10 will rise toward the surface of the water and will maintain its various depths according to the angular adjustment of the plane 16. When the plane 16 is swung all the way back, as shown in Fig. 2, the resistance offered by the plane tends to deflect the water downwardly and consequently elevate the body 10. As the body 10 is drawn through the water, therefore, the plane 16 rides upon the surface of the water and holds the body 10 above or at the surface.

It is thus seen that by the provision of this comparatively simple and easily adjusted attachment, the body 10 of the bait may be maintained at any desired depth in the water, or may even be adjusted to ride upon the surface of the water. It would also be noted that as the plane 16 offers more or less of a resistance to the water, the body 10 will sway laterally to a greater or less degree as the plane seeks the path of least resistance through the water, as the fishing line attached to the screw eye 11 remains taut, and as the body 10 tends to rise.

It is, of course, understood that the body 10 may be made in any suitable manner, and of any suitable material, that the plane 16 may be given any desired shape or configuration and may be attached to the body 10 in any desired manner, without departing from the spirit of this invention. It is also understood that all the parts and arrangements of the above specifically described embodiment of the invention may be changed as found desirable, and necessary within the scope of the following claims.

What is claimed is:—

1. An artificial fish bait comprising a body adapted to be drawn through the water, a plane, means for pivoting the plane upon the body in rear of the front end of the latter so as to swing in the arc of a circle from a position beneath the body and inclined rearwardly to a position in projecting relation to the front end of the body, and adjusting means to retain the plane in either of said positions or any intermediate position.

2. An artificial fish bait comprising a buoyant body adapted for attachment at its head end to a fishing line, and to be drawn through the water, a plane pivoted on the head end of the body and extending transversely across the same, the plane being adapted to be swung into various angular positions beneath the body to regulate the depth thereof when drawn through the water, and means for holding the plane in adjusted position.

3. An artificial fish bait comprising a buoyant body simulating the form of a fish and adapted to be drawn through the water, hooks carried upon the tail end and at the under side of the body, a crescent shaped plane pivoted at its ends to the opposite sides of the body at the head end thereof, a sector plate secured to the body between the same and said plane, and means for locking the plane to the sector plate when the plane is swung to the desired angle to deflect the body to the desired depth in the water.

4. An artificial fish bait comprising a body adapted to be drawn through the water, a plane, and adjustable means for securing the plane at various forward inclinations upon the body, to vary the depth of travel of the body, said adjustable means also being adapted to secure the plane in a rearwardly inclined position to support the body on the surface of the water.

5. An artificial fish bait comprising a body adapted to be drawn through the water, a crescent shaped plane pivoted at its opposite ends against the opposite sides of the body at the forward end thereof, a sector plate secured to the forward end of the body and lying between the plane and the body, the plane having a slot in its inner edge adapted to receive the sector plate therein, a locking disk rotatably mounted on the plane with its peripheral edge overlapping the slotted portion of the plane and having a slot in one side adapted to register with the slot in the plane to admit the passage of the sector plate through the plane and the locking disk, said sector plate having spaced notches therein to receive the peripheral edge of said locking disk whereby when said plane is adjusted to the desired angle said locking disk may be rotated to engage the peripheral edge thereof in the adjacent notch to hold the plane in adjusted position.

6. An artificial fish bait comprising a body adapted to be drawn through the water, a transverse plane pivoted upon the body at its forward end and adapted for adjustment into various downwardly and forwardly extending angles to deflect the body into various depths as it is drawn through the water, and being adapted to be swung backwardly and downwardly beneath the body to support the body at the surface on the water, and means for securing the plane from movement when adjusted into any one of its various positions.

In testimony, that I claim the foregoing as my own, I have hereto affixed my signature.

RICHARD T. WILSON.